Aug. 30, 1927.
G. C. CARHART
CLUTCH CONSTRUCTION
Filed Nov. 7, 1923
1,640,752
2 Sheets-Sheet 2
Fig-2-
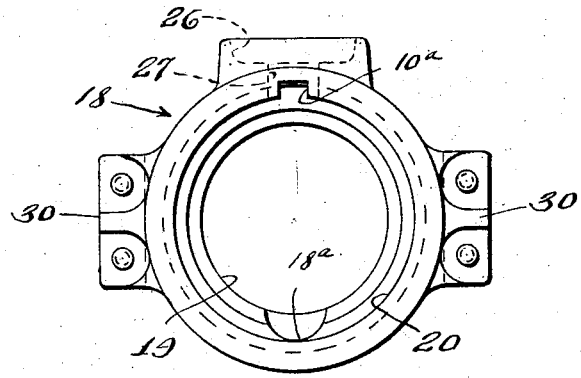
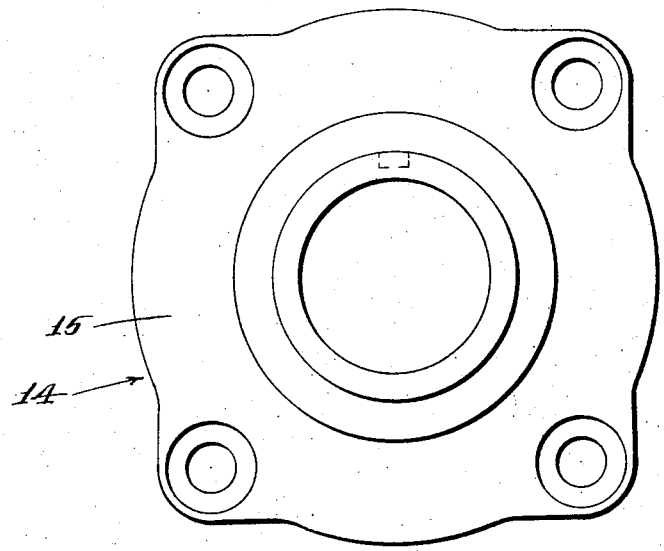
Fig-3-
INVENTOR.
George C. Carhart
BY Parsons & Bodell.
ATTORNEYS.

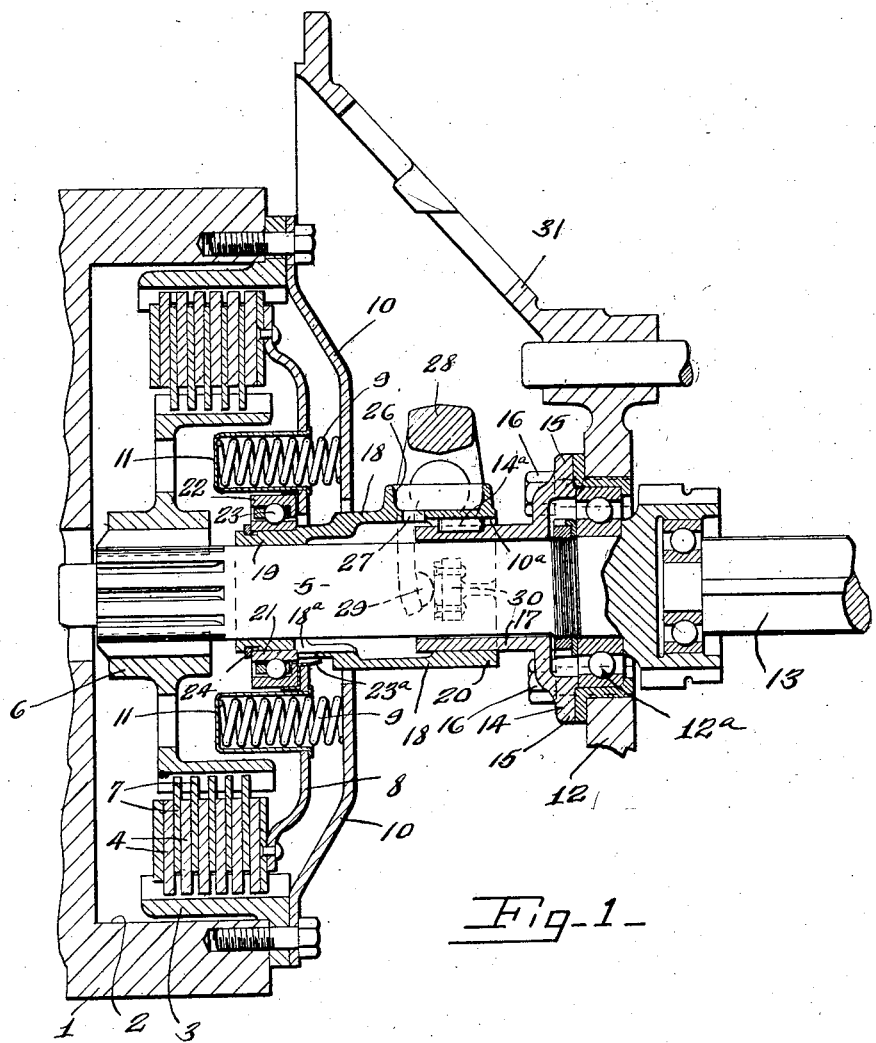

Patented Aug. 30, 1927.

1,640,752

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

CLUTCH CONSTRUCTION.

Application filed November 7, 1923. Serial No. 673,247.

This invention relates to clutches such as are used in motor vehicles, and has for its object a particularly simple, compact and strong construction and arrangement of the shifting member on the shaft of the clutch and on the transmission gearing casing. The invention consists in the novel features and in the combinations and constructions hereinafter set forth and claimed.

In describing this invention, reference is had to the accompanying drawings in which like characters designate corresponding parts in all the views.

Figure 1 is a vertical sectional view of one form of clutch embodying my invention, the contiguous parts of the transmission gear casing being also shown.

Figure 2 is a front elevation of the operating sleeve of the clutch.

Figure 3 is a front elevation of the bearing cap, of the transmission gearing, which partly supports said bearing sleeve.

This clutch construction comprises generally a shaft, a member slidable axially of the shaft, means for shifting said member, and a support for the rear end of the shaft, as a bearing supported in the front wall of the transmission gear casing, the shifting means including a part shiftable axially of the shaft, and supported partly on the shaft and partly on the support, that is, the transmission gear casing or the bearing cap.

The clutch may be of any suitable form, size and construction, that here shown being a disk clutch, comprising driving and driven elements, connected by interleaved disks, a pressure member for compressing the disks, and operating means for withdrawing said pressure member and releasing the disks. The driving element 1 is usually the flywheel of the internal combustion engine of a motor vehicle, such driving element 1 being formed with a cylindrical recess 2, in which is located a member 3, fixed to the fly-wheel in any suitable manner, this member 3 having one series of disks 4 slidably interlocked therewith, in any well known manner. The driven element comprises a shaft 5 having a pilot bearing of any suitable construction in the driving element 1, and a member 6 mounted on the inner end of the shaft to rotate therewith, and having a series of disks 7 interlocked therewith, and interleaved with the disks 4, in the usual manner.

The disks are compressed to engage each other by a compression member 8 shiftable axially of the shaft 5. The compression member may be of any suitable form, size and construction and it is shifted in one direction to compress the disks, so that, they engage and the clutch is "on" by a spring or a series of springs 9 interposed between the back plate 10 and the inner end walls of the thimbles 11, carried by the member 8. The back plate 10 is secured to the driving element 1.

The shaft 5 is supported at its rear end in the front wall 12 of the transmission gear casing, in axial alinement with the driving shaft 13 of the transmission gearing, as will be understood by those skilled in the art, and is journalled in a bearing $12^a$ in such front wall. The transmission gearing case further includes a bearing cap 14, this cap 14 being secured to the front 12 of the transmission gearing case, and having a tubular portion encircling the shaft 5. The bearing cap, as here illustrated, has a base flange at 15, secured to the front wall 12 of the gear case in any suitable manner, as by screws 16. The bearing cap also has a forwardly extending sleeve or tubular portion 17.

The means for shifting the member 8 against the action of the springs 9 to disengage the clutch, comprises a part supported partly on the shaft 5 and partly on the bearing cap or the tubular part thereof, this part being usually a sleeve 18 having a front portion encircling the shaft 5 and a bearing 19 thereon, and a rear portion slidable at 20 on the tubular portion 17 of the cap 14. The sleeve 18 is connected to the pressure member 8 in any suitable manner as by a thrust and a journal bearing consisting of inner and outer rings 21 and 22, thrusting respectively against the inner end of the sleeve 18 and the member 8, and antifriction members or balls 23 between the rings, the inner ring 21 thrusting against a shoulder 24, interlocked with the inner end of the sleeve 18, and the outer ring 22 thrusting against the inner margin of the member 8. The rear portion 20 of the sleeve 18 is slidably keyed to the tubular part of the cap 14 as by a key $14^a$ fixed to the tubular part extending in a relatively long keyway $10^a$ in the rear portion 20 of the sleeve 18.

The sleeve 18 is provided with a suitable oil cup 26 having a passage 27 leading to the periphery of the shaft 5 and to the periphery of the tubular portion 17.

The sleeve 18 is shifted by any well known means as a yoke 28, having arms as 29, thrusting against laterally extending blocks or lugs 30 on the sleeve 18. The sleeve 18 is also formed with an oil duct 18ª leading from its interior through its periphery and arranged to discharge into a pan or deflector 23ª which feeds the oil to the bearing or the balls 23 and the raceways therefor in the rings 21, 22.

In automobile construction, the transmission gearing case is usually provided with a flange or housing as 31, which is bolted or otherwise secured to the engine casing, so that, the transmission gearing is unitary with the clutch and engine casing. By mounting the shifting sleeve 18, partly upon one section of this unit, that is, the shaft which is carried by the flywheel of the engine, and partly on the transmission gearing case, instead of on but one of these two parts, the alignment of the sleeve 18 is maintained and also any tendency to bind more or less is avoided so that the sleeve operates uniformly at all times.

The clutch construction itself forms no part of this invention. The features of this clutch form the subject matter of my co-pending application, Sr. No. 695,360, filed February 26, 1924.

What I claim is:

1. The combination of a clutch including a shaft, a member shiftable axially of the shaft and means for shifting said member and a transmission gear case having a bearing for the rear end of the shaft and a bearing cap mounted on the case and including a tubular portion encircling the shaft, the shifting means comprising a sleeve slidable axially on the shaft and on the tubular portion of the cap, the sleeve enclosing the tubular portion of the cap.

2. The combination of a clutch including a shaft, a member shiftable axially of the shaft and means for shifting said member and a transmission gear case having a bearing for the rear end of the shaft and a bearing cap mounted on the case and including a tubular portion encircling the shaft, the shifting means comprising a sleeve slidable axially on the shaft and on the tubular portion of the cap, said member being formed with an oil duct for supplying lubricant to the shaft and to the bearing between said member and the tubular portion on which it slides.

3. The combination of a clutch including a shaft, a member shiftable axially of the shaft and means for shifting said member and a transmission gear case having a bearing for the rear end of the shaft and a bearing cap mounted on the case and including a tubular portion encircling the shaft, the shifting means comprising a sleeve slidable axially on the shaft and on the tubular portion of the cap, said member being formed with a reservoir for the lubricant and an oil duct leading therefrom to the interior of said member and arranged to supply lubricant to the exterior of the shaft and to the exterior of said tubular portion.

4. The combination of a clutch comprising a shaft, a throw-out member shiftable axially of the shaft and means for shifting said member, a support for the rear end of the shaft, the throw-out member comprising a sleeve slidable on the shaft and slidable on and enclosing a portion of the support and means associated with the throw-out member for supplying lubricant to the periphery of the shaft within the throw-out member and the periphery of the support on which the throw-out member slides.

5. The combination of a clutch comprising a shaft, a throw-out member shiftable axially of the shaft and means for shifting said member, a transmission gear case having a bearing for the rear end of the shaft and a projecting tubular portion surrounding the shaft, the throw-out member including a sleeve having a bearing on the shaft in front of the tubular portion and also a bearing on said tubular portion, the sleeve and the projecting portion of the bearing cap being slidably interlocked to hold the sleeve from turning.

6. The combination of a clutch comprising a shaft, a throw-out member shiftable axially of the shaft and means for shifting said member, a transmission gear case having a bearing cap provided with a bearing for the rear end of the shaft and a projecting tubular portion surrounding the shaft, the throw-out member including a sleeve having a bearing on the shaft in front of the tubular portion and also a bearing on said tubular portion, the sleeve and the projecting portion of the bearing cap being slidably interlocked to hold the sleeve from turning and the sleeve being provided with a lubricant container and a duct leading therefrom to supply oil to the periphery of the shaft and the periphery of the tubular portion.

In testimony whereof, I have hereunto signed my name, at Syracuse, in the county of Onondaga, and State of New York, this 3rd day of November, 1923.

GEORGE C. CARHART.